United States Patent
Fedorynski et al.

(10) Patent No.: US 8,438,155 B1
(45) Date of Patent: May 7, 2013

(54) IMPRESSIONS-WEIGHTED COVERAGE MONITORING FOR SEARCH RESULTS

(75) Inventors: Pawel Aleksander Fedorynski, Menlo Park, CA (US); Hui Xu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/293,991

(22) Filed: Nov. 10, 2011

Related U.S. Application Data (60) Provisional application No. 61/536,550, filed on Sep. 19, 2011.

(51) Int. Cl.
*G06F 17/30* (2006.01)

(52) U.S. Cl.
USPC .......................................................... 707/723

(58) Field of Classification Search .................. None
See application file for complete search history.

(56) References Cited

U.S. PATENT DOCUMENTS

| | | | |
|---|---|---|---|
| 6,338,057 B1* | 1/2002 | Weeks | 707/736 |
| 7,827,170 B1* | 11/2010 | Horling et al. | 707/722 |
| 2004/0220914 A1* | 11/2004 | Cheung et al. | 707/3 |
| 2006/0224593 A1* | 10/2006 | Benton et al. | 707/10 |
| 2006/0282328 A1* | 12/2006 | Gerace et al. | 705/14 |
| 2007/0067267 A1* | 3/2007 | Ives | 707/3 |
| 2007/0204285 A1* | 8/2007 | Louw | 725/14 |
| 2008/0120277 A1* | 5/2008 | Pettinati et al. | 707/3 |
| 2009/0070200 A1* | 3/2009 | August | 705/10 |
| 2010/0262615 A1* | 10/2010 | Oztekin et al. | 707/768 |
| 2011/0314011 A1* | 12/2011 | Buehrer et al. | 707/728 |
| 2012/0203757 A1* | 8/2012 | Ravindran | 707/706 |

* cited by examiner

*Primary Examiner* — Syling Yen
(74) *Attorney, Agent, or Firm* — Brake Hughes Bellermann LLP (57) ABSTRACT

A coverage evaluator determine search results that are a subset of potential search results, the search results provided in response to search requests, wherein a covered portion of the potential search results are associated with quick review information and a non-covered portion of the potential search results are not associated with quick review information. A coverage calculator may calculate a coverage of search results, based on a relation of covered, weighted impressions of the covered portion to weighted impressions, wherein the weighted impressions include non-covered, weighted impressions of the non-covered portion, if any.

17 Claims, 5 Drawing Sheets

IMPRESSIONS-WEIGHTED COVERAGE MONITORING FOR SEARCH RESULTS

CROSS-REFERENCE TO RELATED APPLICATION

This application claims priority to, and is a nonprovisional of, U.S. Application No. 61/536,550, filed on Sep. 19, 2011, entitled "IMPRESSIONS-WEIGHTED COVERAGE MONITORING FOR SEARCH RESULTS", the disclosure of which is hereby incorporated by reference in its entirety.

TECHNICAL FIELD

This description relates to providing computer search results.

BACKGROUND

Conventional search engines operate by indexing, and/or otherwise categorizing or characterizing, large numbers of documents (or other content files) which may potentially be included within search results provided to users in response to search requests from the users. For example, a conventional search engine may have access to an index of documents or other content files, where the index may include a very large number of such content files. Thereafter, the search engine may receive one or more search requests from a user, and may parse or otherwise analyze the search request, for a subsequent comparison of the parsed and/or analyzed search request to content files within the index. Many known techniques exist for correlating the search request with one or more of the indexed content files, to thereby obtain one or more of the content files which are thought to potentially satisfy, and are therefore included in search results of, the search request of the user.

Thus, conventional search engines serve to provide a user with a relatively small set of search results which are identified within the larger index, based on the search request of the user. However, even relatively small sets of search results may be too large for the user to quickly or easily identify a particular document or other content file which includes the specific information desired by the user. Consequently, conventional search engines may be configured to provide the search results in a manner which assists the user in identifying desired information therein.

For example, conventional search engines may rank the search results, and/or may provide quick review information for one or more of the content files of the search results, where such quick review information is designed to assist the user in quickly and easily identifying desired information within the search results. Thus, such quick review information may be designed to assist the user in evaluating individual search results, and may include, e.g., one or more of snippets, summaries, selected and/or representative portions, partial or complete snapshots, or other representations of some or all of the content files of the search results.

In practice, it may be preferable to generate the quick review information prior to receipt of the search request from the user, so as to thereby provide the quick review information as quickly as possible in response to the user's search request. However, as referenced above, an index utilized by a conventional search engine may contain and/or reference a very large number of documents or other content files, so that it may be difficult or time-consuming to pre-generate quick review information for all such content files. Moreover, in practice, it often occurs that only a small fraction of the potential search results indexed by the index of the search engine are likely to be included within actual search results provided to a user. Consequently, generating quick review information for all indexed content files, many of which are unlikely to be included within actual search results, may be inefficient or detrimental with respect to providing fast, accurate search results.

As a result, it may be preferable to generate quick review information only for the subset of indexed content files which are considered to be likely to be included within future search results. However, it may be difficult to optimize a selection of such a subset of the indexed content files, for which generation of quick review information would provide a desired net benefit. Consequently, conventional search engines may generate quick review information either for too many of the indexed content files (thereby using resources inefficiently), or, conversely, may generate quick review information for too few of the indexed content files (thereby being unable to provide necessary or desired quick review information in a sufficiently fast and efficient manner).

SUMMARY

According to one general aspect, a computer system may include instructions stored on a computer-readable medium and executable by at least one processor. The computer system may include a coverage evaluator configured to cause the at least one processor to determine search results that are a subset of potential search results, the search results provided in response to search requests, wherein a covered portion of the potential search results are associated with quick review information and a non-covered portion of the potential search results are not associated with quick review information. The coverage evaluator may include an impressions mapper configured to determine a plurality of impressions of the search results provided to a plurality of users in response to the search requests, and further configured to perform a mapping of the plurality of impressions to the search results to obtain mapped impressions, an impressions based sampler configured to sample the search results based on the mapped impressions, to thereby obtain sampled search results, a weight calculator configured to weight the mapped impressions for each sampled search result, based on a number thereof, to thereby obtain weighted impressions for each of the sampled search results, and a coverage calculator configured to calculate a coverage of the search results, based on a relation of covered, weighted impressions of the covered portion to the weighted impressions, wherein the weighted impressions include non-covered, weighted impressions of the non-covered portion, if any.

According to another general aspect, a computer-implemented method may include executing instructions stored on a computer-readable medium. The method may include determining search results that are a subset of potential search results, the search results provided in response to search requests, wherein a covered portion of the potential search results are associated with quick review information and a non-covered portion of the potential search results are not associated with the quick review information. The method may include determining a plurality of impressions of the search results provided to a plurality of users in response to the search requests, performing a mapping of the plurality of impressions to the search results to obtain mapped impressions, and sampling the search results based on the mapped impressions, to thereby obtain sampled search results. The method may include weighting the mapped impressions for each sampled search result, based on a number thereof, to thereby obtain weighted impressions for each of the sampled search results and calculating a coverage of the search results, based on a relation of covered, weighted impressions of the covered portion to the weighted impressions, wherein the weighted impressions include non-covered, weighted impressions of the non-covered portion, if any.

According to another general aspect, a computer program product may be tangibly embodied on a computer-readable medium and may include executable code that, when executed, may be configured to cause a data processing apparatus to determine search results that are a subset of potential search results, the search results provided in response to search requests, wherein a covered portion of the potential search results are associated with quick review information and a non-covered portion of the potential search results are not associated with the quick review information. The instructions, when executed, may be further configured to cause the data processing apparatus to determine a plurality of impressions of the search results provided to a plurality of users in response to the search requests, perform a mapping of the plurality of impressions to the search results to obtain mapped impressions, sample the search results based on the mapped impressions, to thereby obtain sampled search results, weight the mapped impressions for each sampled search result, based on a number thereof, to thereby obtain weighted impressions for each of the sampled search results, and calculate a coverage of the search results, based on a relation of covered, weighted impressions of the covered portion to the weighted impressions, wherein the weighted impressions include non-covered, weighted impressions of the non-covered portion, if any.

The details of one or more implementations are set forth in the accompa-nying drawings and the description below. Other features will be apparent from the description and drawings, and from the claims.

DETAILED DESCRIPTION

Figure 1:
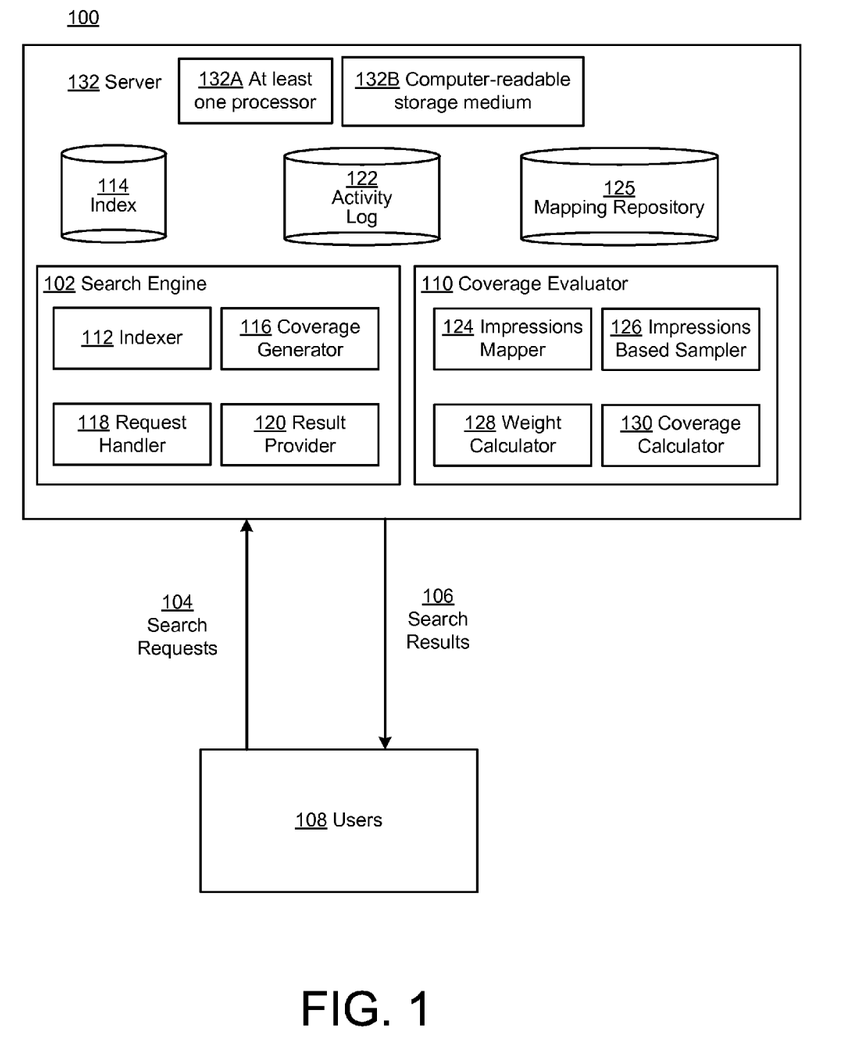
FIG. 1 is a block diagram of a system for providing impressions-weighted coverage monitoring for search systems.

FIG. 1 is a block diagram of a system 100 for providing impressions-weighted coverage monitoring for search systems. In the example of FIG. 1, a search engine 102 receives search requests 104 from, and provides search results 106 to, a plurality of users 108. Further in FIG. 1, a coverage evaluator 110 is illustrated which may be configured to evaluate a success of the search engine 102 in selecting documents, webpages, or other content files from among a larger pool of such content files for association with corresponding quick review information. By judging the success of the search engine 102 in this regard, the coverage evaluator 110 may improve an efficiency of the search engine 102, and may increase an enjoyment and productivity of the users 108 with respect to the search results 106.

The search engine 102, except as described herein or would be understood to one of skill in the art, may represent any one of a number of conventional search engines. As such, the search engine 102 may include many conventional features and functions which are not necessarily described here in detail, except as may be necessary or helpful in understanding operations of the system 100 of FIG. 1. For example, the search engine 102 may include an indexer 112 which may be configured to construct an index 114 of webpages, documents, audio and/or video files, or various other types of content files, for use thereof in providing the search results 106 in response to the search requests 104.

Many different conventional indexing techniques may be implemented by the indexer 112 to construct the index 114. For example, the indexer 112 may include, or may communicate with, a crawler (not specifically illustrated in the example of FIG. 1) which is configured to collect, identify, or otherwise determine webpages, documents, or other content files for potential inclusion within the index 114. The indexer 112 may thereby obtain the various content files, and may parse the content of the content files so as to, e.g., identify specific words, phrases, images, or other discrete contents within the identified content files. In this way, the discrete, extracted content may be included in the index 114, and thereafter matched against content of the search request 108 in order to correspond specific search requests with potentially relevant ones of the indexed content files. In this way, the search results 106 may be provided to the users 108, and may be likely to include particular content which satisfies the corresponding search requests 104.

As referenced above, the search results 106 also may include many content files which do not adequately satisfy the corresponding search request to a satisfaction of the relevant user, or, in some cases, may not include any content which satisfies the search requests 106 of the user. Consequently, as referenced above and is as well known, the search results 106 may be provided in conjunction with, or represented by, corresponding quick review information, which may allow the users 108 to quickly and easily discern whether a particular search result is likely (or not likely) to provide the user's desired information.

For example, it may occur that a search request of the search requests 104 yields 100 documents that are ultimately included within the search results 106. In the example, it may occur that only one of the 100 documents represents the actual document sought by the users, and that the 100 documents are ranked by the search engine 102 in an order which is thought to correspond to a likelihood of satisfying the search request 104 to the satisfaction of the user. In this case, a search engine 102 may initially provide the top 10 (or some other subset) of the 100 documents within the search results (e.g., may provide links to the top 10 search results within a single screen-shot or view), where the top 10 results may be assumed for the sake of the example to include the desired document. Further, each of the top 10 documents may be represented to the user using corresponding quick review information for each of the 10 documents. In this way, as just referenced, the user may easily tell from the quick review information associated with each of the 10 documents which of the 10 documents is the desired document, and may thereby select a corresponding link and obtain the desired document.

In order to provide such functionality, the search engine 102 may include a coverage generator 116 which may be configured to generate quick review information for any selected document or other content file from the index 114. As is known, there are many types of quick review information which may be provided by the coverage generator 116. For example, the coverage generator 116 may generate quick review information for a selected document from the index 114 by extracting portions of the document which are thought to be representative of the document as a whole. Various algorithms are known which may be implemented by the coverage generator 116 to perform such extractions, or otherwise to represent content of the selected document in a manner which provides for quick review thereof by the user in conjunction with, or as part of, the search results 106.

In a particular example of a type of quick review information which may be provided by the coverage generator 116, the coverage generator 116 may generate a visual snapshot of a representative portion (e.g., a first page) of a document or other content file within the index 114. Such a visual snapshot may be particularly useful in enabling the user to determine whether the underlying document is a desired document, and therefore enables the user 108 to obtain desired information in a fast and convenient manner.

For example, referring back to the example provided above, it may occur that the search engine 102 provides the top 10 search results by transmitting a snippet of each document of the top 10 search results, so that 10 snippets are displayed within a browser or other graphical user interface of the user in conjunction with 10 corresponding links to the underlying documents. Then, assuming for the sake of example that each of the top 10 search results has been provided with quick review information in the form of a visual snapshot by the coverage generator 116, it may occur that the user may hover a cursor over (or otherwise select or designate) a selected one of the 10 snippets (and/or associated one of the 10 links), and may immediately be provided with a visual snapshot of the underlying document within the browser or other GUI, without any additional navigation being required on the part of the user.

As just referenced, such visual snapshots may be useful in enabling the user to ascertain whether a particular document referenced in the top 10 search results represents a desired document. As also referenced above, techniques for generating such visual snapshots or other quick review information are currently known and/or may be developed in the future, and are not necessarily described herein in further detail, except as necessary or helpful in understanding an operation of the coverage evaluator 110 or other elements of the system 100 of FIG. 1.

Thus, as described, the search engine 102 may operate in a largely conventional manner, e.g., including indexing a large number of documents or other content files within the index 114, using the indexer 112. As described, the coverage generator 116 may select a subset or portion of the indexed content files, and may generate quick review information (e.g., visual snapshots) for the selected content files, where the quick review information may be stored within, or in association with, the index 114 and/or the corresponding content files. In this way, the search request 104 may be received at the search engine 102 by a request handler 118. A result provider 120 may analyze the received search request, and may select search results using the index 114 to provide to the users 108 with the search results 106, and, where available, with associated quick review information.

In performing the above and other functions, the search engine 102 may generally utilize and deploy an available, finite amount of resources. For example, the search engine 102 may take a certain amount of time to obtain, index, and provide coverage (e.g., generate quick review information) for some or all of the content files of the index 114. Naturally, the search engine 102 also uses an available, finite amount of computer memory, processing resources, and various other physical and/or human resources in performing the various features and functions described herein. Thus, designers and operators of the system 100, including the search engine 102, may seek to obtain a balance in deploying available resources, so as to optimize the providing of the search results 106 in a manner which is fast and accurate, and which minimizes any wasteful or inefficient use of the available resources.

In the examples that follow, it is assumed that the index 114 includes or references a large number of webpages which have been indexed for searching by the indexer 112. Of course, as referenced above and as would be understood, the index 114 may contain or reference virtually any type of searchable, indexable content files. Thus, in the following examples, it is further assumed that the users 108 may interact with the search engine 102 (e.g., submit search requests 104) using a web browser or other suitable graphical user interface which is configured to communicate with the search engine 102 over a computer network (e.g., the public internet, or a private intranet). Again, however, it will be appreciated that the search engine 102 may be executed in various other contexts, and that the system 100 as a whole may provide the features and functions described herein in a manner appropriate to a particular context. For example, it may occur that the users 108 interact directly with the search engine 102 on a single computing device, rather than over a network, or that the system 100 is implemented as part of a private network, e.g., a corporate network provided by an enterprise for its employees and/or customers.

Thus, in the referenced examples, the coverage generator 116 may be configured to implement one or more algorithms for selecting a subset or portion of the indexed webpages of the index 114, and thereafter generating quick review information for each such webpage within the selected subset and/or portion. As referenced above, the coverage generator 116 may be configured to implement one or more such algorithms in a manner which optimizes a likelihood that webpages included within the search results 106 are associated with quick review information when provided to the users 108. That is, as described, the coverage generator 116 may be configured to provide such optimization relative to an amount of available resources assigned to the coverage generator 116.

Thus, in the example of FIG. 1, the index 114 may be understood to contain or reference a very large number of indexed webpages. As may be understood from the above description, such webpages thus represent potential search results in that it is possible that at some future time the request handler 118 may receive a search request 104 such that the result provider 120 identifies a specific webpage within the potential search results of the index 114 for inclusion within the actual search results 106.

In practice, however, it may occur that only a relatively small percentage or portion (e.g., 1%, 5%, or 10%) are actually provided, or likely to be provided, as actual search results within the search results 106. For example, certain webpages or types of webpages included within the potential search results of the index 114 may be more likely to be requested and viewed by a large number of users, or may be likely to be requested and viewed very frequently by a relatively smaller group of users. Thus, in such scenarios, it may be appreciated that the coverage generator 116 may be configured to provide coverage for (e.g., generate and store quick review information for) the portions of the potential search results of the index 114 which are most likely, most frequently, or most often to be included within the search results 106 that are actually provided to the user 108.

As a result, it may be considered that the potential search results associated with the index 114 may include a covered portion or subset thereof which the coverage generator 116 has associated with corresponding quick review information for each included webpage, as well as a non-covered portion or subset which is not associated with coverage by the coverage generator 116 with corresponding quick review information. As described, the covered portion of the potential search results thus represents a subset thereof which is considered to be likely to be frequently provided within the search results 106, while the non-covered portion of the potential search results of the index 114 are generally thought to correspond to the majority of the potential search results which are unlikely to be, or infrequently are, included within the search results 106.

In this regard, then, in the example of FIG. 1, the coverage evaluator 110 may thus be understood to be configured to evaluate or otherwise judge an efficacy of the coverage generator 116 in selecting webpages and generating associated coverage (e.g., quick review information) for an optimal or otherwise appropriate subset of the potential search results of the index 114. For example, the coverage evaluator 110 may determine that the coverage generator 116 has provided an unnecessarily large covered portion within the potential search results of the index 114 (e.g., has generated quick review information for webpages of the index 114 which are rarely or never included, or likely to be included, within the search results 106). Conversely, the coverage evaluator 110 may determine that the coverage generator 116 has provided an inadequately-sized covered portion within the potential search results of the index 114 (e.g., has failed to generate quick review information for webpages which have, in fact, been included frequently or in large number within the search results 106). In other words, the coverage evaluator 110 may be configured to determine in the former case that the coverage generator 110 has used available resources inefficiently by generating unnecessary coverage of webpages within a potential search results of the index 114, or, in the latter case, that the coverage generator 116 is likely to have caused an inconvenience to the users 108 by failing to provide coverage (e.g., quick review information) for an unacceptable number of webpages that are actually included in the search results 106.

In this regard, it may be appreciated that it is additionally or alternatively possible for the coverage evaluator 110 to perform a straightforward storing of webpages included within the actual search results 106, and to simply compute a percentage of the search results 106 which are provided with quick review information. However, such techniques may not always be sufficient, optimal, and/or preferable.

For example, the techniques described herein with respect to the system 100 of FIG. 1 provide an independent evaluation of provided coverage, as compared to the additional or alternative technique(s) just referenced. Further, the described techniques may be used when no quick review information is currently being provided by the result provider 120 (e.g., related feature(s) are currently turned off), and/or without requiring any changes to the result provider 120 or other components of the search engine 102, relative to conventional implementations thereof.

Therefore, in the example of FIG. 1, the coverage evaluator 110 may be configured to evaluate the efficacy of the coverage generator 116 in generating coverage for the selected portion of the potential search results of the index 114 by utilizing an activity log 122 which is configured to log the activities of the request handler 118 and the result provider 120 in evaluating the search request 104 against the potential search results within the index 114, to thereby correspond and select webpages therefrom which are thought to satisfy the search request 104. More specifically, the activity log 122 may be configured to store a number of times that a particular webpage was requested and selected for providing thereof, in addition to storing an identity of each such webpage.

In this context, as a matter of terminology, an occurrence of such a search request and subsequent selection of a webpage for providing to the users 108 may be referred to as an impression of the thus-selected webpage. In other words, an impression simply refers to an instance in which a webpage is selected during providing a response to a search request, regardless of an identity of the requesting user. Thus, a webpage that is thus-requested 10 times by a single user, or once each by 10 users, or twice each by 5 users, would represent 10 impressions of the webpage in question in any such scenario.

In theory, it is possible for the coverage evaluator 110 to evaluate an efficacy of the coverage generator 116 simply by determining a total number of impressions for covered webpages associated with quick review information relative to a total number of impressions for all the webpages of the index 114. In practice, however, as referenced above, the index 114 may be associated with a very large number of individual webpages, so that it may be impossible or impractical to evaluate coverage in the manner just described.

In order to reduce an amount of computing resources needed to evaluate coverage provided by the coverage generator 116, the coverage evaluator 110 may selectively sample webpages from the index 114, in order to obtain a smaller set of webpages to evaluate, based on the assumption that the results determined for the sample will be reflective of coverage provided for the index 114 as a whole. For example, the coverage evaluator 110 may select every $1000^{th}$ or $10,000^{th}$ web page from the index 114, or may use other known sampling techniques used to extract a sampled subset from the index 114. Then, as just referenced, the coverage evaluator 110 may be configured to determine a total number of impressions for covered webpages included in the sample, relative to a total number of impressions for all the webpages in the sample subset (i.e., including impressions for non-covered webpages).

Such techniques, by themselves, may, however, be insufficient to adequately and consistently represent a level of success of the coverage generator 116 in designating the covered portion of the index 114. For example, such techniques may suffer from a high degree of variance, and may therefore make it difficult for an operator of the system 100 to accurately judge whether or what modifications may be needed, if any, with respect to operations of the coverage generator 116.

In other words, for example, in such techniques it may occur that in one evaluation of the coverage evaluator 110 using the just-described sampling techniques, the coverage generator 116 is determined to be highly accurate and complete with regard to determining a covered portion of the index 114. For example, during the evaluation it may be determined that virtually all of the evaluated impressions are associated with coverage in the form of quick review information. However, in an immediately subsequent evaluation, the coverage evaluator 110 may determine that an unacceptable number of impressions designated for providing to the users 108 are uncovered and not associated with quick review information.

Such variances in coverage evaluations may result from the use of the above referenced sampling techniques. Specifically, for example, it may commonly occur that a first webpage from the index 114 may be selected for providing to the users 108 only a single time, while a second webpage from the index 114 may be selected for providing to the user 108 many hundreds or thousands of times or more. In other words, particular webpages may have a high degree of variation in terms of a number of impressions associated with each, simply stemming from the fact that some webpages are more popular or otherwise more frequently viewed than others.

Consequently, when using the sampling techniques described above, it may randomly occur that a webpage associated with a very large number of impressions may be selected for inclusion within the sample. In such a case, if the webpage is associated with coverage in the form of quick review information, the result may be a judgment of good coverage by the coverage generator 116. On the other hand, if the sampled subset randomly does not include such a high impression webpage, and in its place includes a low impression webpage which may not be associated with coverage in the form of quick review information, then the coverage evaluator 110 may judge that the coverage generator 116 has done a relatively poorer job of providing coverage for the search results 106.

In other words, the use of sampling techniques in evaluating operations of the coverage generator 116 with respect to the index 114 may be advantageous in terms of reducing a computational load of the coverage evaluator 110. However, such advantages may be offset in whole or in part by variances in the evaluation results which are related, e.g., to the inherently skewed nature of the impressions distribution of webpages of the index 114. In order to reduce such variances and provide stable, accurate, and representative evaluations of the coverage generator 116, the coverage evaluator 110 may be configured to take into account the highly skewed nature of the impressions distribution of webpages of the index 114, e.g., by providing impressions-weighted coverage evaluations, as described in detail herein.

For example, as referenced above, the activity log 122 may be configured to store all received search requests 104, including relative information such as included search terms, time and date of receipt, and other relevant information, and to thereafter log webpages selected for providing to the users 108 in response to the search request 104. The activity log 122 may thus store a record of each individual impression of a given webpage.

Subsequently, an impressions mapper 124 of the coverage evaluator 110 may be configured to perform a mapping of the impressions of the given webpage to the webpage itself, and to store such mapping data within a mapping repository 125. In other words, it may occur that a record of 100 impressions is stored by the activity log 122, so that the impressions mapper 124 may identify or otherwise determine each webpage (e.g., 5 different webpages) represented in the set of impressions, and to thereafter map a number of impressions for each webpage to the corresponding webpage (e.g., to map, in a simplified example, 20 impressions of the 100 impressions to each of the 5 webpages).

In this way, a sampler 126 of the coverage evaluator 110 may be configured to perform impressions-based sampling of search results (e.g., webpages selected for providing to the users 108 within the search results 106) based on a number of impressions of each search result. Specific techniques for such impressions-based sampling are described in detail below with respect to FIGS. 2-4. However, it may be generally understood that the sampler 126 may be configured to be more likely to include a high impression webpage within a sample subset of search results than to include a webpage having few or no impressions within the search results. For example, the sampler 126 may thus be configured to individually input webpages from the index 114, and to sample (e.g., to keep or discard) the webpages based on an assigned probability factor along with a number of impressions, if any, of the currently considered webpage of the index 114, based on the mapping 125 of the impressions mapper 124 which relates impressions from the activity log 122 to corresponding webpages of the index 114.

A weight calculator 128 may thereafter be configured to assign a weight to the impressions of each webpage of the sample search results received from the sampler 126. For example, as described in detail below, the weight calculator 128 may be configured to assign relatively higher weights to high impression webpages within the sample search results. In this way, the weight calculator 128 may enable the coverage evaluator 110 to accurately reflect the fact that coverage or non-coverage of high impression websites to generally be considered more important in evaluating operations of the coverage generator 116 than coverage or non-coverage of low impression webpages.

Finally with respect to the coverage evaluator 110, a coverage calculator 130 may receive outputs of the weight calculator 128 and the sampler 126, and may calculate a measure or other evaluation of the operation of the coverage generator 116 based thereon. For example, similarly to the coverage metric referenced above, the coverage calculator 130 may simply determine a total number of weighted impressions of the sample search results which are provided with coverage, relative to a total number of weighted impressions of all the sampled search results (independently of coverage or non-coverage thereof).

In the simplified example of FIG. 1, the system 100 is illustrated as executing using at least one computing device 132, which is further illustrated as including at least one processor 132A and a computer readable storage medium 132B. Thus, it may be appreciated that instructions for executing the system 100 may be stored using the computer readable storage medium 132B, and executed by the at least one processor 132A to enable and perform the various features and functions of the system 100 described herein.

Of course, it will be appreciated that many variations of the system 100 are possible. For example, the system 100 may be implemented using a computing device having multiple processors and/or multiple memories, or other computer readable storage media. Also, instances of the computer readable storage medium 132B may be used for storage of data associated with the index 114, the activity log 122, the mapping data of the mapping repository 125, or other data necessary or useful for implementation of the system 100. Further, the system 100 may be executed using multiple computing devices which are in communication with one another, e.g., over a network. For example, some or all of the search engine 102 may be implemented using multiple computing devices, while the coverage evaluator 110 executes on one of such computing devices, or on a separate computing device in communication therewith.

Somewhat similarly, although the simplified example of FIG. 1 illustrates a number of separate and discrete components implementing the functionalities described herein, it may be appreciated that, in other implementations of the system 100, multiple ones of such functions may be combined for execution by a single component, or, conversely, a single component of FIG. 1 may be separated for separate execution by two or more components. Many other implementation variations are possible, and would be apparent to one of skill in the art, and therefore are not described here in detail.

Figure 2:
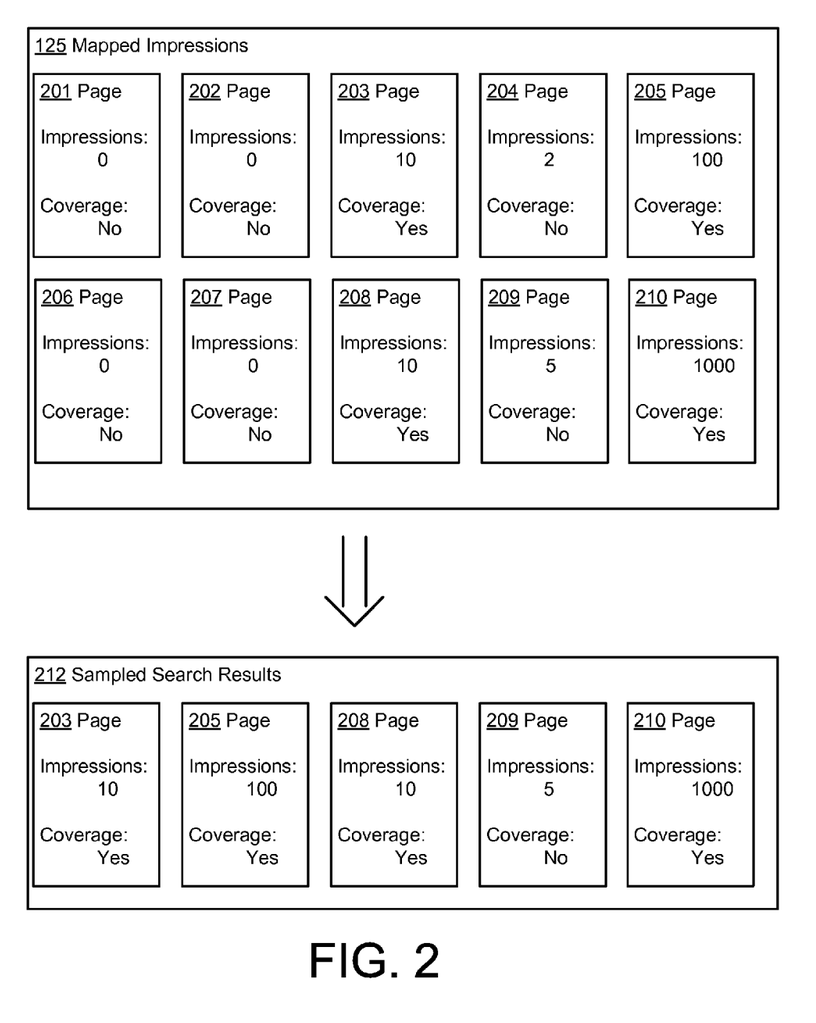
FIG. 2 is a block diagram representing webpages being monitored for coverage using the system of FIG. 1.

FIG. 2 is a block diagram illustrating simplified implementation examples of portions of the system 100 of FIG. 1. Specifically, in the example of FIG. 2, mapped impressions 125 are represented as including illustrated webpages numbered consecutively between 201 and 210 in the example of FIG. 2. As shown, each of the pages 201-210 have been mapped to a corresponding number of impressions associated therewith as determined by the impressions mapper 124. Further, an indication of coverage or lack of coverage of each individual webpage is also indicated.

Thus, for example, the webpage 201 of the index 114 is illustrated as being mapped to 0 impressions, and not having associated coverage of quick review information. Similarly, the webpage 202 is illustrated as having 0 impressions and no coverage. On the other hand, the webpage 203 is illustrated as having 10 impressions and as being covered. The webpage 204 is illustrated as having 2 impressions with no coverage, while the webpage 205 is illustrated as having 100 impressions, as well as associated coverage. Continuing in the example, the webpages 206 and 207 have no impressions and no coverage, while the webpage 208 has 10 impressions and has coverage. The webpage 209 has 5 impressions and no coverage, and, finally, the webpage 210 has 1000 impressions and has coverage.

Thus, the example of FIG. 2 illustrates a highly simplified example in which the index 114 includes the 10 documents 201-210, and in which the coverage generator 116 has executed its one or more coverage algorithms in order to determine that coverage should be provided for webpages 203, 205, 208, and 210, but that no coverage should be provided for webpages 201, 202, 204, 206, 207, and 209. As described, the coverage generator 116 may be configured to execute such coverage algorithms with the goal of providing coverage for as many impressions included in the search results 106 as possible, given whatever resource constraints may be faced by the coverage generator 116 with respect to executing such operations. Meanwhile, as also described, the coverage evaluator 110 may be configured to judge the operations of the coverage generator 116 in achieving this goal.

As described with respect to FIG. 1, the impression-based sampler 126 may be configured to sample the webpages of the index 114 based on the mapped impressions, so that, generally speaking, high impression webpages are more likely to be included in the sample than low impression webpages. As a result of such impression-based sampling operations, sampled search results 212 may be obtained. As shown in the simplified example, the sample search results 212 may include the webpages 203, 205, 208, 209, and 210. The sampled search results 212 are thus illustrative of the fact that high impression webpages are generally more likely to be included therein than low impression webpages.

As referenced above, the weight calculator 128 may thereafter assign a weight to each of the number of impressions of the webpages 203, 205, 208, 209, and 210, in order to reflect the fact that coverage or non-coverage of high impression webpages may be considered more important than coverage or non-coverage of low impression webpages. Subsequently, the coverage calculator 130 may consider all of the total number of weighted impressions of the covered webpages 203, 205, 208, and 210, relative to the total number of impressions of all webpages in the search results (i.e., 203, 205, 208, 209, and 210). In this way, as described, a coverage of the impressions selected for providing to the users 108 may be quickly and accurately evaluated, with a low degree of variance between different iterations of the evaluations.

Figure 3:
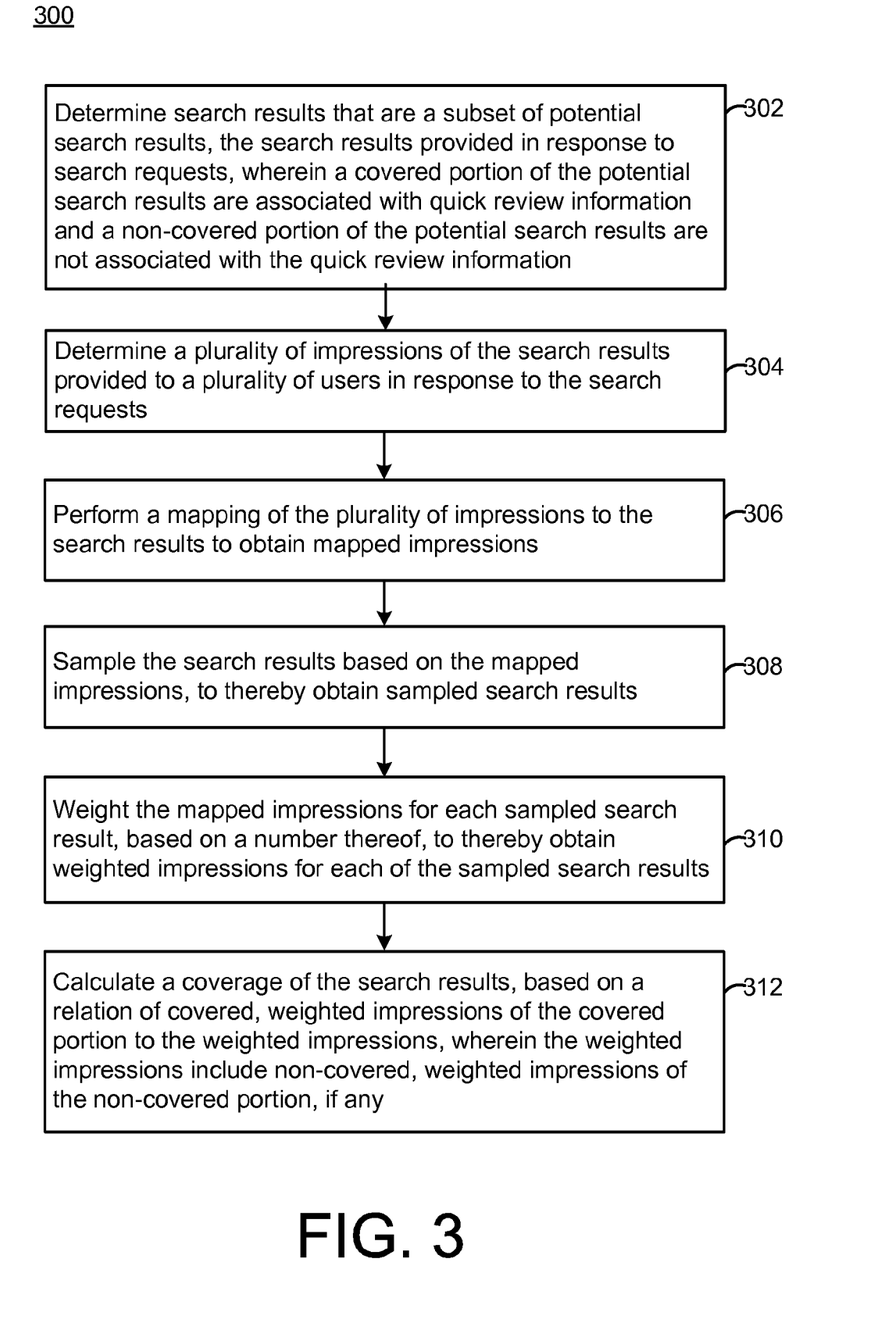
FIG. 3 is a flowchart illustrating example operations of the system of FIG. 1.

FIG. 3 is a flowchart 300 illustrating example operations of the system 100 of FIG. 1. In the example of FIG. 3, example operations 302-312 are illustrated as separate, sequential operations. However, it may be appreciated that such illustrations are merely for the sake of example, and that additional or alternative implementations are possible. For example, two or more of the operations 302-312 may be executed in a wholly or partially overlapping or parallel manner, or in a nested or looped manner. In other examples, additional operations may be included and/or may replace one or more of the illustrated operations, while one or more of the operations may be modified or removed.

In the example of FIG. 3, search results that are a subset of potential search results may be determined, where the search results are provided in response to search requests, and wherein a covered portion of potential search results are associated with quick review information and a non-covered portion of the potential search results are not associated with the quick review information (302). For example, with respect to FIG. 1, the index 114 may include potential search results in the form of webpages, documents, or other content files, and may potentially be selected for providing a response to a search request 104. As described, within or in association with the index 114, such potential search results may each be associated with quick review information generated by the coverage generator 116 and designed to assist users 108 and quickly reviewing search results 106 provided to the users 108. As described, the covered portion of potential search results may represent a minority of the potential search results, and may reflect the fact that a majority of the potential search results may rarely or never be provided within the search results 106, so that generation of quick review information therefore would be inefficient or wasteful.

A plurality of impressions of the search results provided to a plurality of users in response to search requests may be determined (304). For example, the activity log 122 may store a record of the impressions associated with webpages or other content files selected from the index 114 by the result provider 120 in response to the search request 104. The search results selected for providing a response to search requests may be determined using the activity log 122, based on historical data of searches conducted over the previous day, week, or other selected time frame.

A mapping of the plurality of impressions to the search results may be performed to obtain mapped impressions (306). For example, the impressions mapper 124 may map impressions from the activity log 122 to individual webpages selected for inclusion in the search results. Specifically, in the example of FIG. 2, webpages 201-210 illustrate a result of such impressions mapping with respect thereto.

The search results may be sampled based on the mapped impressions, to thereby obtain sampled search results. For example, the impressions based sampler 126 may sample the search results from the activity log 122, based on a sampling probability and on a number of corresponding mapped impressions associated therewith. For example, with respect to FIG. 2, as described above, the impressions based sampler 126 may sample the search results 201-210 in a manner which increases a likelihood that a particular webpage will be included in the sample search results 212 when the particular webpage has been mapped to a relatively large number of impressions.

The mapped impressions for each sampled search result may be weighted based on a number thereof, to thereby obtain weighted impressions for each of the sample search results (310). For example, the weight calculator 328 may associate a weight with a number of impressions of each of the sampled search results 203, 205, 208, 209 and 210 of FIG. 2.

A coverage of the search results may thus be calculated, based on a relation of covered weighted impressions to the weighted impressions, where the weighted impressions include non-covered, weighted impressions of the non-covered portion, if any (312). For example, the coverage calculator 130 may count all the weighted impressions of the sampled search results 203, 205, 208, 210, and relate these to all of the weighted impressions of the sampled search results 212 as a whole (e.g., including both the just-mentioned covered, weighted impressions for the webpages 203, 205, 208, 210, as well as the non-covered sample webpage 209).

Figure 4:
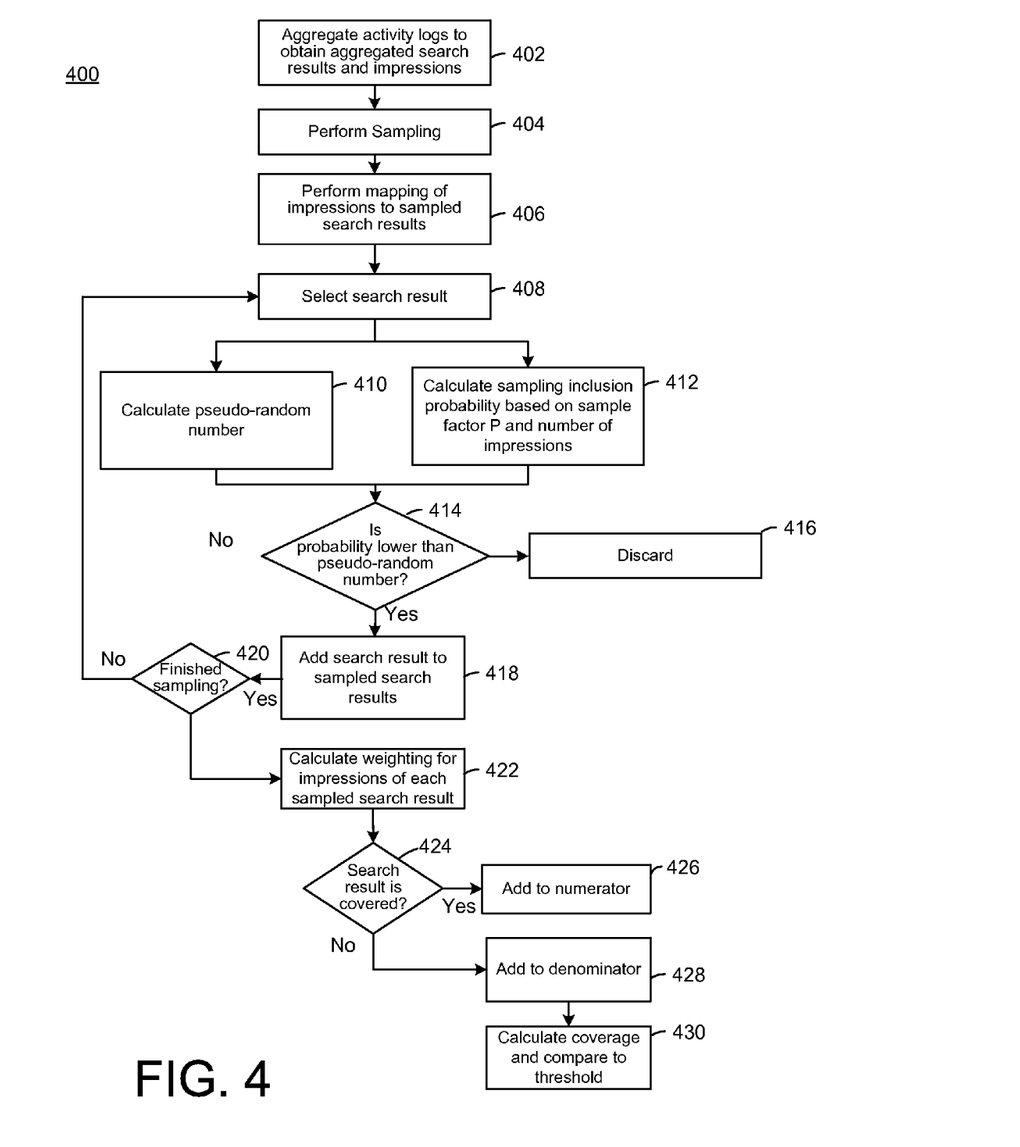
FIG. 4 is a second flowchart illustrating more detailed example operations of the system of FIG. 1.

FIG. 4 is a flowchart 400 illustrating more detailed example implementations of the system 100 of FIG. 1. In the example of FIG. 4, activity logs may be aggregated over a selected period of time to obtain aggregated search results and corresponding impressions (402). In the example of FIG. 4, an initial sampling may be implemented to reduce a size of the resulting aggregated search results and impressions (404). For example, the sampler 126 or another sampler may be used to perform a conventional sampling in which every $1000^{th}$ or $10,000^{th}$ or other selected probability factor webpage may be included. Such initial sampling may be performed very conservatively, e.g., may utilize a sampling probability factor which produces a sampled subset of the aggregated search result impressions which is relatively large compared to the aggregated search result impressions as a whole, i.e., which does not reduce the aggregated search results and impressions sufficiently to introduce the types of difficulties referenced above, e.g., increased variances and coverage evaluations.

The impressions mapper 124 may thereafter perform the mapping of the impressions to the search results within the activity logs (406). Thereafter, sampling may proceed with selection of a search result from the mapped search results and impressions (408). In one example sampling technique, a pseudo-random number may be calculated (410), while a sampling inclusion probability is also calculated based on a sample factor P and a number of impressions mapped to the selected search result (412).

For example, the impressions based sampler 126 may calculate such a sampling inclusion probability using Equation 1, as illustrated below.

$$1-(1-P)^N \quad \text{Equation (1)}$$

If the inclusion probability is not lower than the pseudo-random number (414), then the selected search result may be discarded (416), i.e., may be non-included in the sample search results (if, however, the inclusion probability is lower than the pseudo-random number (414), then the selected search result may be added to the sampled search results set (418). If sampling is not finished (420), then a subsequent search result may be selected (408), and operations 410-418 may proceed as described above.

If sampling is finished (420), then a weighting for impressions of each sample search result in the sample search result set may be calculated (422), e.g., using the weight calculator 128. For example, the weight calculator 128 may assign a weight to each number of impressions associated with a given sampled search result using Equation (2) below.

$$\frac{(N)(P)}{[1-(1-P)^N]} \quad \text{Equation (2)}$$

As may be observed, Equation 2 may be understood to represent a conditional expected number of impressions of the sampled search result in question which is included in the sample, given that at least one impression was included, and assuming, as described, that each individual impression may be selected or not with the probability P according to Equation 1 above.

Thus, the weighted number of impressions for each search result may be individually selected, and if the search result in question is covered (e.g., is associated with quick review information), then the weighted number of impressions may be added to a numerator of coverage calculation Equation (3) provided below (426).

$$\text{coverage} = (\text{weighted impressions of covered search results/weighted impressions of non-covered search results}) \quad \text{Equation (3)}$$

As described above, regardless of whether a given search result is covered (424), the corresponding weighted number of impressions are ultimately added to the denominator of the coverage calculation of Equation (3) (428). Once all such weighted impressions are appropriately included within the coverage calculation equation of Equation (3), coverage may be calculated based thereon by the coverage calculator 130 (430). As also illustrated, and as referenced above, the calculated coverage may be compared against a desired or threshold level of coverage which was previously designated by an operator of the system 100, e.g., in conjunction with a design and operation of the coverage generator 116. In this way, the operator may be enabled to judge whether the coverage generator 116 is operating in a desired manner to provide desired coverage results.

Figure 5:
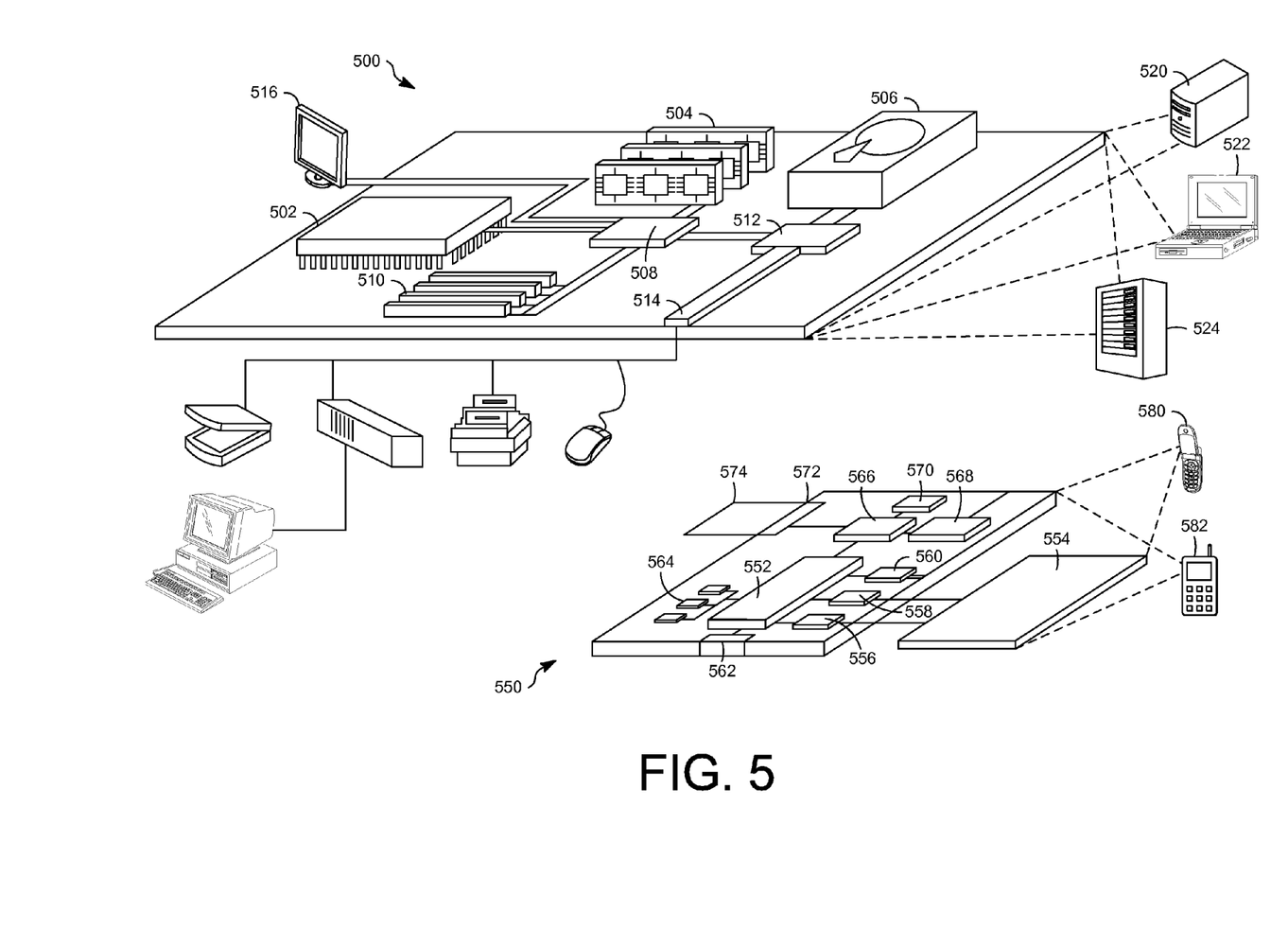
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly and/or machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A computer system including instructions stored on a non-transitory computer-readable medium and executable by at least one processor, the computer system comprising:
   a coverage evaluator configured to cause the at least one processor to determine search results that are a subset of potential search results, the search results provided in response to search requests, wherein a covered portion of the potential search results are associated with quick review information and a non-covered portion of the potential search results are not associated with quick review information, the coverage evaluator including
   an impressions mapper configured to determine a plurality of impressions of the search results provided to a plurality of users in response to the search requests, and further configured to perform a mapping of the plurality of impressions to the search results to obtain mapped impressions,
   an impressions based sampler configured to sample the search results with a sample factor P and based on the mapped impressions, to thereby obtain sampled search results, wherein the impressions based sampler is configured to:
   include a search result in the sample with a probability $1-(1-P)^N$, where N represents a corresponding number of impressions of the search result within a determined time period, a weight calculator configured to weight the mapped impressions for each sampled search result, based on a number thereof, to thereby obtain weighted impressions for each of the sampled search results, wherein the weight calculator is configured to weight corresponding mapped impressions of the search result with a weight $$\frac{(N)(P)}{[1-(1-P)^N]}$$

and a coverage calculator configured to calculate a coverage of the search results, based on a relation of covered, weighted impressions of the covered portion to the weighted impressions, wherein the weighted impressions include non-covered, weighted impressions of the non-covered portion, if any.

2. The system of claim 1, wherein the quick review information for each corresponding content file of the potential search results includes a representative portion of the corresponding content file.

3. The system of claim 2, wherein the quick review information includes a visual snapshot of at least a portion of the corresponding content file.

4. The system of claim 1, wherein the coverage evaluator is further configured to compare the calculated coverage against a threshold coverage level.

5. The system of claim 1, wherein the coverage evaluator is configured to determine the plurality of search results, and the impressions mapper is configured to determine the plurality of impressions, based on an activity log which includes historical search data over a defined time period.

6. The system of claim 1, wherein the coverage evaluator is configured to sample the plurality of search results prior to the mapping.

7. The system of claim 1, wherein the coverage calculator is configured to calculate the relation as a fraction of the covered, weighted impressions within the weighted impressions.

8. A computer-implemented method including executing instructions stored on a computer-readable medium, the method comprising:

determining search results that are a subset of potential search results, the search results provided in response to search requests, wherein a covered portion of the potential search results are associated with quick review information and a non-covered portion of the potential search results are not associated with the quick review information;

determining a plurality of impressions of the search results provided to a plurality of users in response to the search requests;

performing a mapping of the plurality of impressions to the search results to obtain mapped impressions;

sampling the search results with a sample factor P and based on the mapped impressions, to thereby obtain sampled search results;

including a search result in the sample with a probability $1-(1-P)^N$, where N represents a corresponding number of impressions of the search result within a determined time period;

weighting the mapped impressions for each sampled search result, based on a number thereof, to thereby obtain weighted impressions for each of the sampled search results;

weighting corresponding mapped impressions of the search result with a weight $$\frac{(N)(P)}{[1-(1-P)^N]}; \text{ and}$$

calculating a coverage of the search results, based on a relation of covered, weighted impressions of the covered portion to the weighted impressions, wherein the weighted impressions include non-covered, weighted impressions of the non-covered portion, if any.

9. The method of claim 8, wherein the quick review information for each corresponding content file of the potential search results includes a representative portion of the corresponding content file.

10. The method of claim 8, wherein the quick review information includes a visual snapshot of at least a portion of the corresponding content file.

11. The method of claim 8, wherein the plurality of search results and the plurality of impressions are determined using an activity log which includes historical search data over a defined time period.

12. The method of claim 8, wherein the plurality of search results are sampled prior to the mapping.

13. A computer program product, the computer program product being tangibly embodied on a non-transitory computer-readable medium and including executable code that, when executed, is configured to cause a data processing apparatus to:

determine search results that are a subset of potential search results, the search results provided in response to search requests, wherein a covered portion of the potential search results are associated with quick review information and a non-covered portion of the potential search results are not associated with the quick review information;

determine a plurality of impressions of the search results provided to a plurality of users in response to the search requests;

perform a mapping of the plurality of impressions to the search results to obtain mapped impressions;

sample the search results with a sample factor P and based on the mapped impressions, to thereby obtain sampled search results;

include a search result in the sample with a probability $1-(1-P)^N$, where N represents a corresponding number of impressions of the search result within a determined time period;

weight the mapped impressions for each sampled search result, based on a number thereof, to thereby obtain weighted impressions for each of the sampled search results;

weight corresponding mapped impressions of the search result with a weight $$\frac{(N)(P)}{[1-(1-P)^N]}; \text{ and}$$

calculate a coverage of the search results, based on a relation of covered, weighted impressions of the covered portion to the weighted impressions, wherein the weighted impressions include non-covered, weighted impressions of the non-covered portion, if any.

14. The computer program product of claim 13, wherein the quick review information includes a visual snapshot of at least a portion of a corresponding content file.

15. The computer program product of claim 13, wherein the executable code, when executed, is further configured to compare the calculated coverage against a threshold coverage level.

16. The computer program product of claim 13, wherein the plurality of search results and the plurality of impressions are determined using an activity log which includes historical search data over a defined time period.

17. The computer program product of claim 13, wherein the plurality of search results are sampled prior to the mapping.

* * * * *